(12) United States Patent
Kinerk et al.

(10) Patent No.: US 7,705,838 B2
(45) Date of Patent: Apr. 27, 2010

(54) MOVABLE USER INTERFACE

(75) Inventors: Keith E. Kinerk, Fontana, WI (US); Daniel Wong, Wildwood, IL (US)

(73) Assignee: Motorola, Inc., Schaumburg, IL (US)

( * ) Notice: Subject to any disclaimer, the term of this patent is extended or adjusted under 35 U.S.C. 154(b) by 720 days.

(21) Appl. No.: 11/554,892

(22) Filed: Oct. 31, 2006

(65) Prior Publication Data

US 2007/0120838 A1 May 31, 2007

Related U.S. Application Data

(62) Division of application No. 10/334,057, filed on Dec. 30, 2002, now abandoned.

(51) Int. Cl.
  *G06F 3/033* (2006.01)
  *G09G 5/00* (2006.01)
(52) U.S. Cl. ........................................ 345/184; 345/156
(58) Field of Classification Search .................. 345/156, 345/157, 166–168, 184; 341/35
  See application file for complete search history.

(56) References Cited

U.S. PATENT DOCUMENTS

| | | | | |
|---|---|---|---|---|
| 4,786,982 A | * | 11/1988 | Wakahara et al. | 386/81 |
| 5,936,613 A | * | 8/1999 | Jaeger et al. | 345/172 |
| 6,011,542 A | * | 1/2000 | Durrani et al. | 345/156 |
| 6,233,406 B1 | * | 5/2001 | Iwamoto | 396/284 |
| 6,266,098 B1 | * | 7/2001 | Cove et al. | 348/563 |
| 6,744,427 B2 | * | 6/2004 | Maglio et al. | 345/184 |
| 6,771,582 B1 | * | 8/2004 | Hori | 369/75.11 |
| 6,809,661 B1 | * | 10/2004 | Badarneh | 341/31 |
| 7,151,531 B2 | * | 12/2006 | Shepherd et al. | 345/168 |
| 7,395,512 B2 | * | 7/2008 | Makabe et al. | 715/816 |
| 7,420,547 B2 | * | 9/2008 | Takahashi | 345/184 |
| 7,466,307 B2 | * | 12/2008 | Trent et al. | 345/173 |
| 2003/0001816 A1 | * | 1/2003 | Badarneh | 345/156 |
| 2004/0104898 A1 | * | 6/2004 | Badarneh | 345/169 |

FOREIGN PATENT DOCUMENTS

KR  2002036862  *  5/2002

* cited by examiner

*Primary Examiner*—Ricardo L Osorio
(74) *Attorney, Agent, or Firm*—Gary J. Cunningham

(57) ABSTRACT

A wireless communication handset (100) having a movable housing portion (204) coupled to a housing portion (202) that rotates relative to the housing portion. The movable housing portion may be a ring that rotates from one position 200 to another position 300 relative to the housing. Rotation of the ring to a first position activates a first function. Indicia 210 disposed on the ring indicates the desired mode. Rotation of the ring to a second position activates a second mode corresponding to a second indicia on the ring. The ring is interchangeable with other rings (FIG. 5 through FIG. 7) having different indicia corresponding to different modes or functions. The software that corresponds to the different modes may be stored in a memory 104 of the device or downloaded to the device upon coupling the ring thereto.

5 Claims, 8 Drawing Sheets

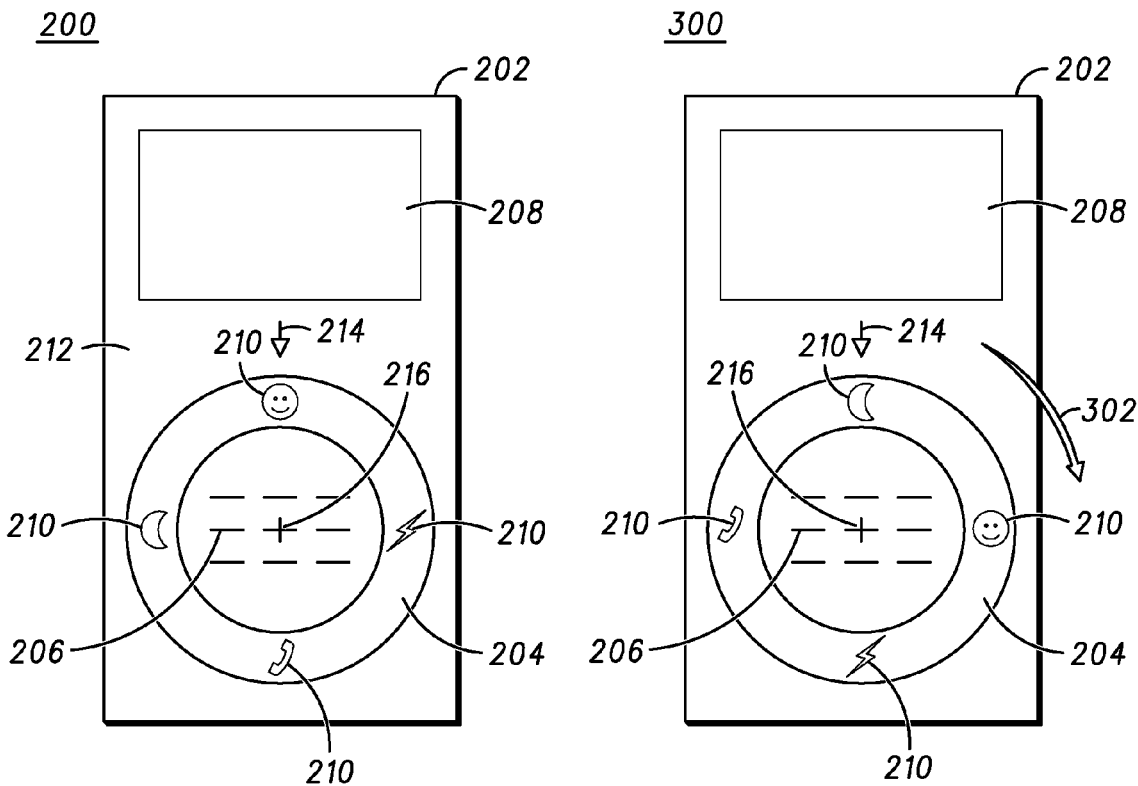
FIG. 2   FIG. 3
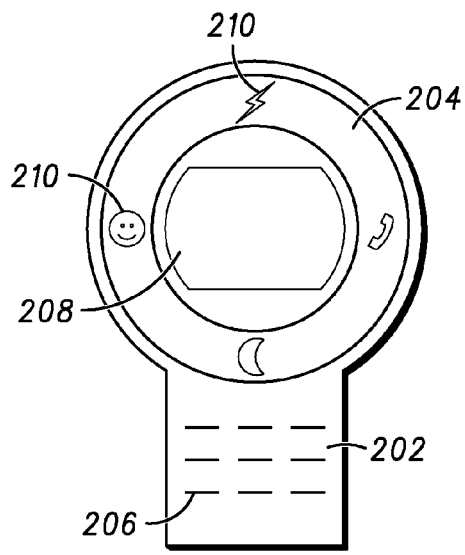
FIG. 4

MOVABLE USER INTERFACE

FIELD OF THE INVENTIONS

The present invention relates generally to user interfaces of communication devices, and more particularly to rotating user interfaces to control functions of the device.

BACKGROUND OF THE INVENTIONS

Portable electronic devices, particularly wireless communication devices, may incorporate multiple functions that are selectable from the user interface of the device. These devices are taking on more and more capability and ease of use of the user interface becomes increasingly more complex typically in direct proportion to the number of features or type of features available. For example a wireless communication device may function as a radiotelephone, a personal digital assistance (PDA), a gaming device, a messaging, pictorial or video console, or any combination thereof. Navigation to one or more of the functions, menus or modes of the device can take the user through iteratively more steps and key presses to get to the desired function as the number of functions available increases.

To add the functionality and maintain the portable handheld size of the device, the keys of the user interface are typically assigned multiple functions. This however is contrary to the small size and the desire to reduce the complexity of operation of the device.

Another method used to simplify the ease of use of multifunctional devices is to assign menu short cut buttons. For instance the Palm Pilot by Palm uses menu shortcut buttons on the front of the device to gain quick access to different frequently accessed menus or function of the device. However this takes up space on the housing of the device. In addition these buttons are physically non-configurable.

Accordingly, a system is needed to improve ease of use for devices with multiple functions, menus or operation modes on portable devices such as wireless communication devices. Providing an apparatus to easily and quickly navigate from mode to mode, menu to menu while allowing increased flexibility and interchangeability of certain portions of the device and still maintain the integrity and robustness of the device is needed.

The various aspects, features and advantages of the present invention will become more fully apparent to those having ordinary skill in the art upon careful consideration of the following Detailed Description of the Invention with the accompanying drawings described below.

BRIEF DESCRIPTION OF THE DRAWINGS

FIG. 2 is an exemplary view of the removable user interface;

FIG. 3 is an exemplary view of the removable user interface;

FIG. 4 is an exemplary view of the removable user interface;

DETAILED DESCRIPTION OF THE INVENTIONS

The present invention is a device that has multiple functions such as wireless communicating, handheld computing, and gaming. More particularly various inventive concepts and principles are embodied in the adaptable user interfaces and methods for providing such devices with ease of use and limited complexity. Any combination of functionality is possible; a gaming device with a cell phone portion, a cell phone with a gaming portion or any combination of a number of functionalities including, messaging, internet browsing, personal organizer or personal digital assistant capabilities, or the like. Although not required these more feature rich handheld devices often are arranged and constructed to operate on higher bandwidth systems such as GPRS (General Packet Radio System) systems, or wideband CDMA (code division multiple access) systems or systems that are packet data enabled and that enable connectivity or sessions with IP (Internet Protocol) based networks, including for example packet data based systems such as $3^{rd}$ generation or UMTS (Universal Mobile Telephone Services) systems. As further discussed below various inventive principles and combinations thereof are advantageously employed to provide unique controls for specific functions.

The portable electronic device comprises a first housing portion capable of retaining electronic components a moveable housing portion, coupled to said first housing portion and moveable to a plurality of positions relative to said first housing portion. The moveable housing portion can be rotateable or removable or both. The moveable housing portion further comprises at least two indicia, a first indicia indicative of a first mode of said device and a second indicia indicative of a second mode of said device. The device also comprises a detector, sensor or switch for detecting the plurality of positions of said moveable housing portion relative to said first housing portion. The device further comprises a controller that is coupled to the detector.

In one exemplary embodiment the movable housing portion is a rotateable housing portion. Rotating the rotateable housing portion from a first position to a second position, relative to the first housing portion, changes the mode of the device from a first mode to a second mode, displays a menu or activates a function of the device corresponding to an icon or indicia on the rotateable housing portion.

Figure 1:
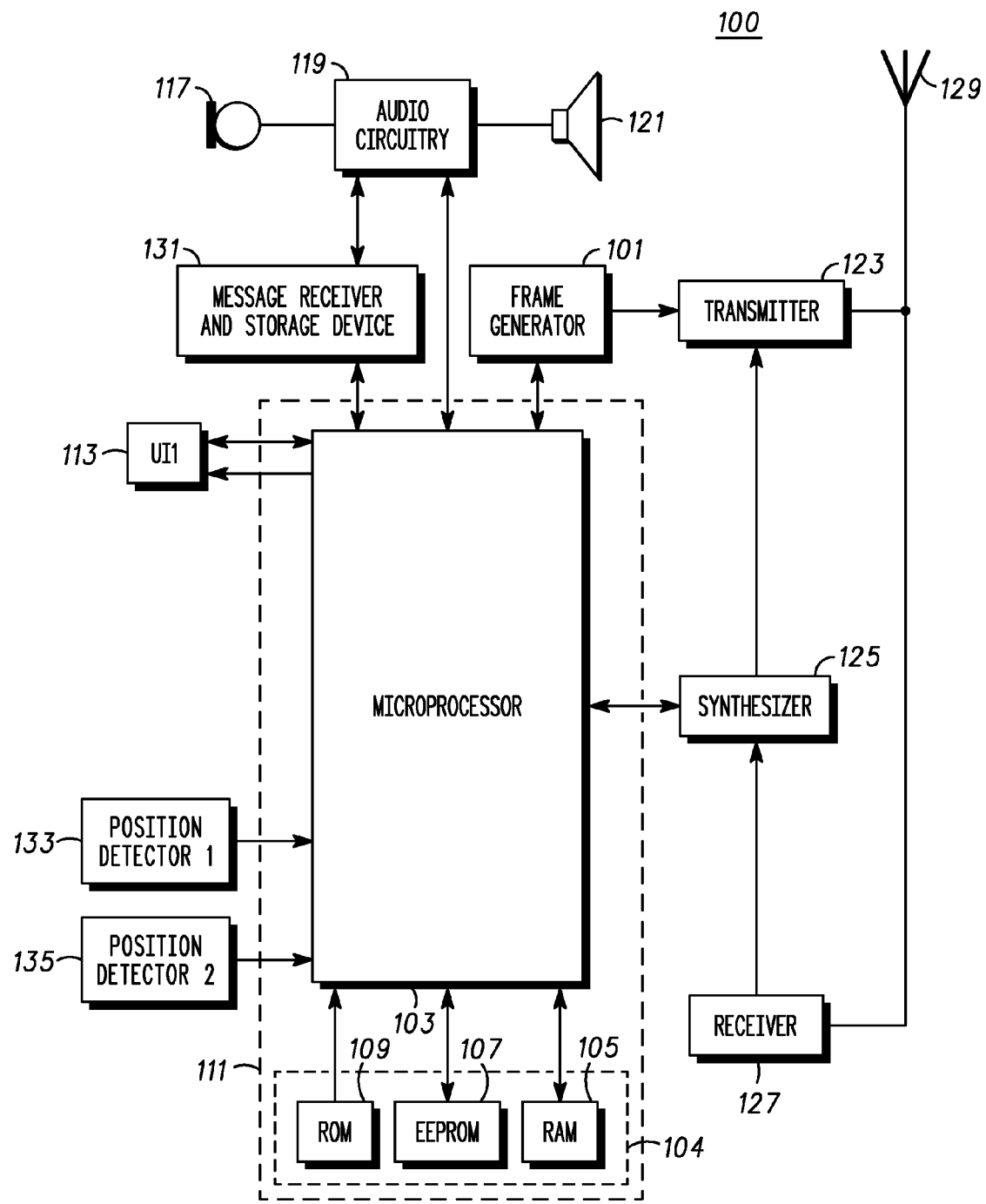
FIG. 1 is an exemplary block diagram of a wireless communication handset circuitry.

Turning now to FIG. 1, an exemplary wireless communication device or handset such as a cellular radiotelephone comprises, a frame generator ASIC 101, such as a CMOS ASIC available from Motorola, Inc. and a microprocessor 103, such as a 68HC11 microprocessor also available from Motorola, Inc., combine to generate the necessary communication protocol for operating in a cellular system. Microprocessor 103 uses memory 104 comprising RAM 105, EEPROM 107, and ROM 109, preferably consolidated in one package 111, to execute the steps necessary to generate the protocol and to perform other functions for the wireless communication device, such as writing to a user interface or display 113, accepting input from a position detector 133 such as a ESE 23 or ESE 24 2W detector switch available from Panasonic, or others as explained below. Controller 103 also controls transmitter 123 synthesizer, 125 and receiver 127 for transmitting and receiving communications and more particularly downloading software that corresponds to the coupled rotateable user interface. ASIC 101 processes audio transformed by audio circuitry 119 from a microphone 117 and to a speaker 121.

Referring to FIG. 2, a radiotelephone or handset 200 is shown. The handset 200 has wireless communication capabilities and, thus, may be used to communicate with wireless infrastructure, such as cellular base stations, regional and local wireless transponders, and wireless local area networks. The handset 200 described herein is a representation of the type of wireless communication device that may benefit from the present invention. However, it is to be understood that the present invention may be applied to any type of portable electronic device and is not limited to the following devices: radiotelephones, cordless phones, paging devices, personal digital assistants, portable computers, pen-based or keyboard-based handheld devices, remote control units, audio players (such as MP3 players) and the like. Accordingly, at least for the present invention the radiotelephone 100 is equivalent to other portable electronic devices, non-limiting examples of which were provided above.

Also shown in FIG. 2, the handset 200 housing 202 comprises a movable housing portion 204, a plurality of keys 206 and a display 208. The movable housing portion 204 has a plurality of indicia 210 formed at specific positions on the movable housing portion 202. In an exemplary embodiment the movable housing portion 204, the plurality of keys 206 and the display 208 are all mounted on a first face 212 of the housing 202. This is not necessary as one skilled in the art would recognize that these components do not need to necessarily be on the same face or in substantially the same plane, as shown in the exemplary embodiment. It is conducive for the user to be able to readily access these components in a manner that allows ease of use of the device in an appropriate proximate relative location of one component to another. For example, it is conducive for the display 208 and the movable housing portion 204 to be visible at the same time in most cases. However, if there are no indicia on the movable housing portion 204, it may not be necessary to locate the display 208 on the same face as the movable housing portion 204, as the position of the movable housing portion 204 would be indicated by the changing of the information on the display 208.

In the exemplary embodiment, shown in FIG. 2 through FIG. 4, the movable housing portion 204 is a selector ring 204 (ring) and is rotated relative to the housing 202 such that the indicia corresponding to the desired mode is rotated to align with a indicator mark 214 on the first face 212 of the housing 202. As illustrated by FIG. 3, arrow 302 shows rotation of the selector ring 204 from the first position 200 (FIG. 2) to align in a second position 300 the desired indicia 210 with the indicator mark 214. Rotation may be in either the first direction or a second direction, clockwise or counter clockwise. The position detector 133 determines the position of the ring 204 relative to the housing 202 and the desired function is called into operation by processor 103. The ring 202 may also encompasses the display 208 as shown in FIG. 4. In either case the ring 204 rotates about a first axis 216 and as shown in FIG. 4 around the display.

Figure 5:
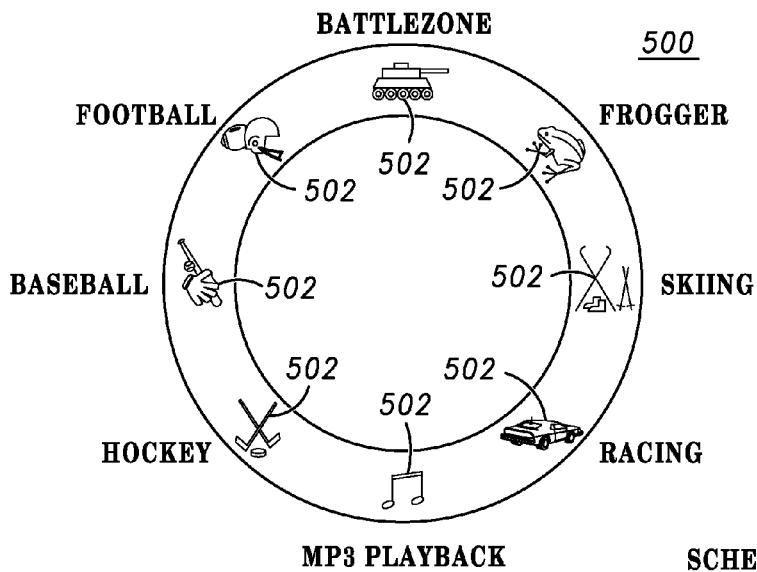
FIG. 5 is an exemplary view of the selector ring.
Figure 6:
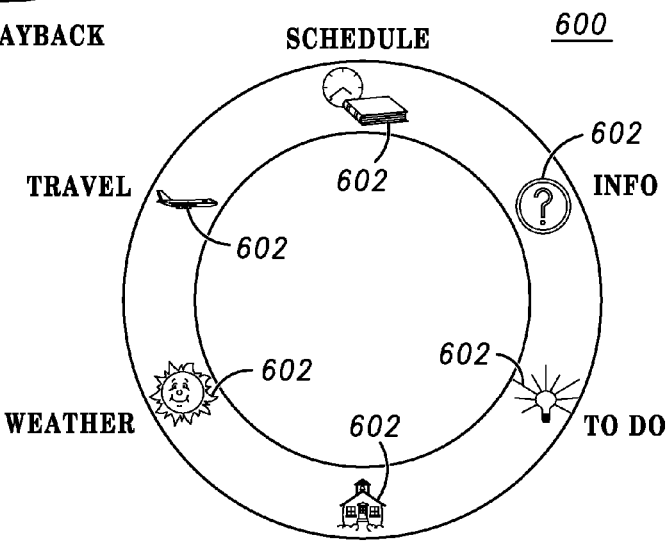
FIG. 6 is an exemplary view of the selector ring.
Figure 7:
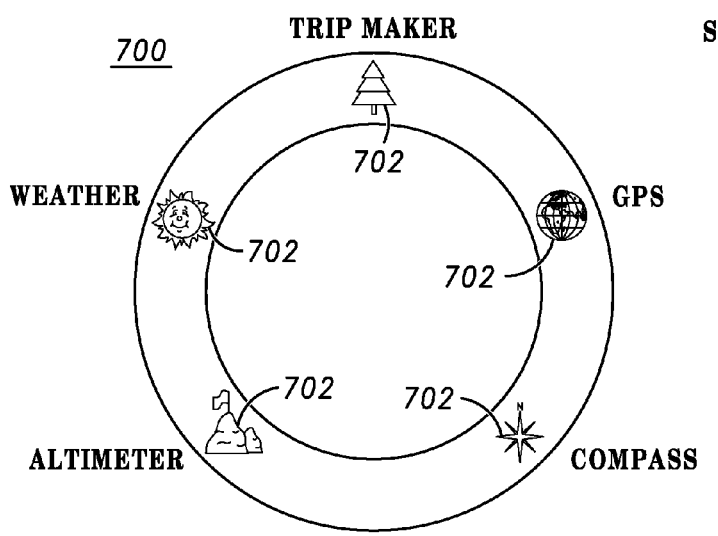
FIG. 7 is an exemplary view of the selector ring.

In one exemplary embodiment, shown in FIG. 5 through FIG. 7 the selector ring 204 is removably coupled to the housing 202. If another desired function is required, the user could interchange the ring 204 with a different ring, such as those in FIG. 5 through FIG. 7 each having new or different indicia that represent different menus modes or functions of the device. The indicia may be a simple mark or arrow that denotes the position of the ring 204 only, and the display would show an icon that is related to the indicia, similar to a soft key that is programmable. FIG. 5 illustrates a selector ring 204 with indicia representing different games. FIG. 6 illustrates an organizer selector ring having a "contact" icon, a "to do" icon, "schedule" or "calendar" icon and the like and FIG. 7 is an exemplary view of an adventure selector ring comprising icons for a "GPS", "Altimeter", "compass", "trip maker", "weather" and the like.

The display 208 may be any type of output device that provides a convenient display of text and/or graphics to the user. Preferably, the display 208 is a liquid crystal display having a backlighting system to illuminate the display when lighting conditions are insufficient for proper viewing by the user. The lens may also function to lock certain components of the handset 200 together as well as the display lens to protect the display 208 from undesirable, foreign matter. The ring 204 may interact with the display 208 and the ring 204 may be interchanged to match multiple colors of the display for example.

Figure 8:
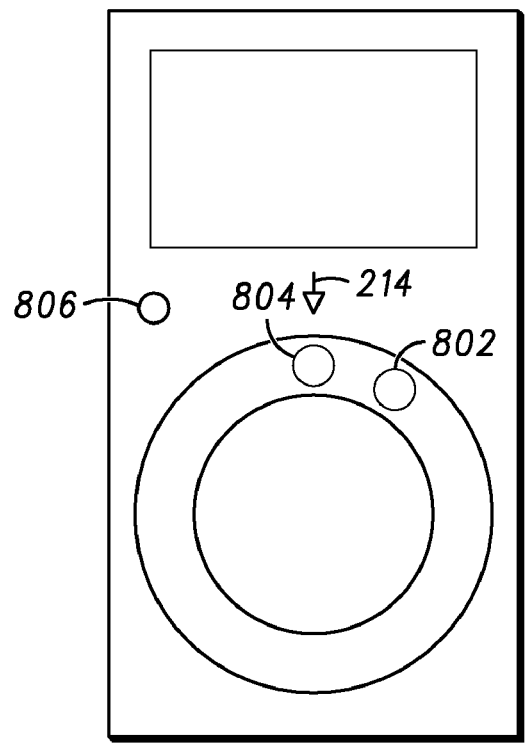
FIG. 8 is an exemplary view of the removable user interface removed.
Figure 9:
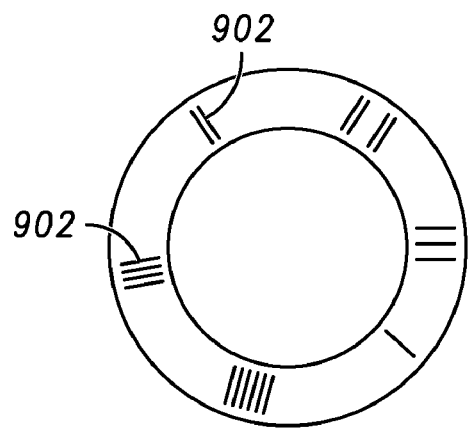
FIG. 9 is an exemplary view of the back side of the removable user interface.

Identifying which mode by positioning the ring 204 is desired can be determined by a number of different methods. Each ring 204, 500, 600, and 700 has a unique ID or key that allows the device to identify which ring is coupled to the housing 202. In another exemplary embodiment, the time would dictate which ring is coupled to the device or in combination with a specific position of the ring 204. As illustrated in FIGS. 8 and 9, the unique ID may be a unique pattern 902 on a back surface 904 of the ring 204 that is read by an optical sensor 802 such as a barcode or pattern 902 on the ring 204. Upon installation of the ring 204, the sensor in the housing 202 of the electronic device would scan the pattern 902 and compare the ID to a database to determine which functions and respective positions on the ring are associated with the ring 204. The database may be stored in the device or wirelessly transmitted to the device upon installation of the ring 204 from the service provider or from an internet address identified in the ring 204. Once the device has obtained the address for where to retrieve the ring information, a request is initiated by the device through a carrier provider. This allows a third party service provider to develop software and retail the ring 204. The customer purchases the ring and installs it on the device and the software is automatically downloaded to the device.

The device housing 202 may also have a proximity sensor that is capable of reading a unique ID in the ring. The unique ID is stored in a memory in the ring and inductively transmitted when coupled to the housing 202. The proximity sensor in the housing 202 reads the unique ID to determine which ring 202 is coupled to the housing 202. Once the device has the unique ID the pertinent information regarding the ring can be processed as discussed above. Once the device has determined which ring 204 is installed on the housing, the position of the housing will be determined.

In one exemplary embodiment, the ring 204 can only be installed in one orientation relative to the housing 202. Therefore the device knows the starting or origination position of the ring 204 when it is first installed and can further determine which position it is in by tracking in the rotation from the known original position.

In another exemplary embodiment, markings on the bottom of the ring 204 indicate to a position sensor 802 in the housing 202 which position the ring 204 is relative to the housing 202. The position sensor 802 such as the bar code reader reads the bar code 902 and changes the mode accordingly. The position sensor 802 may at regular frequency read the bar code 902 to determine if there has been a change. The position sensor 802 may also be triggered by another switch that is activated when the ring 204 is rotated from one position to another. The detection of rotation and position is discussed in further detail below.

In one embodiment, rotation of the ring 204 to the desired position automatically triggers the activation of the desired function as discussed above. In another exemplary embodiment, shown in FIG. 7, each icon of the ring 204 is disposed on a button 702 coupled to the ring 204. Each ring 204 has one or more indicia and therefore one or more respective buttons. A switch 804 is coupled to the housing 202 and is aligned adjacent to the indicator mark 214 and when the ring 204 is in place, the button 702 on the ring 204 is depressably couplable to the switch 804. A poppel may or may not be present and coupled to the switch. The poppel adds user feedback to the switch activation to give the user a tactile feedback that the switch has been activated. The switch then activates or initiates the desired mode in accordance with the relative position of the ring 204. In another exemplary embodiment, the ring is rotated to a relative position and an activation button 806 is depressed to activate the desired function as shown in FIG. 8.

In any case, the ring may rotate freely in a 360 degree circle without any stops. As the ring 204 may also have detents such that the ring is restrained at each desired position, and does not move without some minimum force. This prevents accidental changing of the mode or function by unwanted rotation.

Figure 10:
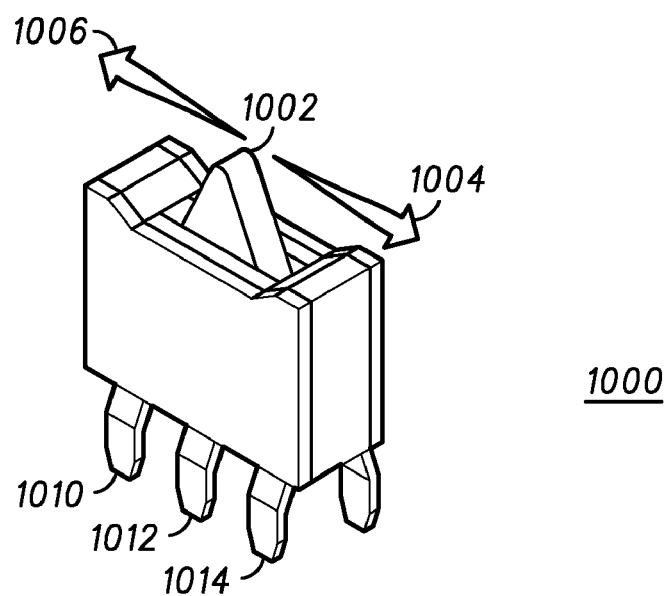
FIG. 10 is an exemplary view of a rotation sensor.

The position sensor 133 may be one of many types of sensors or detectors used to determine rotational movement and position. Converting the mechanical rotational motion of both the rotateable user interface 204 into electrical signals that are sent to the processor 103 is done with switches or sensors coupled to the either of the user interfaces, mechanically or optically and the first housing portion 202. In FIG. 10 a switch 1000 is shown. This switch is a detector switch, such as an ESE 23 or ESE 24 from Panasonic. The switch lever 1002 in a normally open position when it is in a first or stationary position. The switch lever 1002 can move in two directions, a first direction 1004 and a second direction 1006. The switch lever 1002 is spring loaded such that a force applied in either direction moves the switch lever 1002 and when the force is removed from the switch lever 1002, the switch lever 1002 will spring back to the first or stationary position.

When the switch lever 1002 is moved in the first direction 1004, a first circuit between the contacts 1010 and 1012 is complete or closed and when the switch lever 1002 is moved in the second direction 1006, a second circuit between the contacts 1014 and 1012 is completed or closed.

Figure 11:
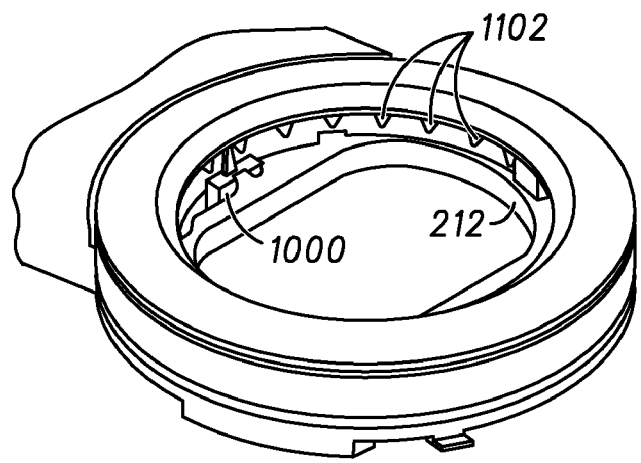
FIG. 11 is an exemplary view of the selector ring and rotation sensor.

This switch 1000 is coupled to the housing 202 as shown in FIG. 11. The switch lever 1002 is position such that it will selectively couple with actuators or teeth 1102 which are coupled to the ring 204. The teeth 1102 rotate with the rotateable user interface as it rotates, the teeth 1102 selectively couple to the switch lever 1002 and depending on the direction of rotation, move the lever in either the first direction 1004 or the second direction 1006. When the ring 204 is rotated, a first actuator couples with the switch lever 1002 and moves the switch lever in the first direction 1004. The circuit between 1010 and 1012 is closed and a signal is sent to the processor 103. The processor 103 generates the command to indicate the position of the ring. When the ring 204 is rotated to position, illustrated by arrow 302, a second actuator couples with the switch lever 1002 and moves the switch lever 1002 in the second direction 1006. The circuit between 1010 and 1012 is closed and a signal is sent to the processor 102. The processor generates the command to indicate movement on the ring 204.

In the case of the freely rotating user interface 204, a plurality of teeth 1102 are selectively coupled to the rotateable user interface 210 as the ring 204 rotates in either direction. Each time a tooth couples with said switch lever 1002, the switch lever 1002 is moved in the first or second direction, depending upon the rotation direction of the ring 204, and either the first circuit or second circuit is closed. Rotating the rotateable user interface 210 in one direction allows a plurality of teeth to selectively couple to the switch lever and repeatedly move the switch lever 1002 in the same direction. The affect is the tracking of the position of the ring 204 relative to the housing 202.

The relative positions of the ring 204 may also be detected by a rotary encoder having a first encoder portion coupled to one of the housing portions and a relatively fixed encoder portion coupled to the other housing portion.

Figure 12:
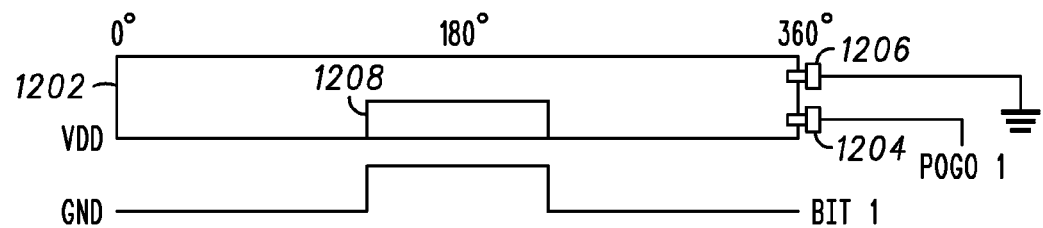
FIG. 12 is an exemplary one-bit rotary encoder and corresponding digital encoder output diagram.

FIG. 12 illustrates a first exemplary rotary encoder embodiment comprising a partially conductive strip 1202 with bit patterns formed thereon 1208. The strip 1202 is formed into a ring and fastened to one housing portion. At least two conductors, for example, pogo pins 1204 and 1206, are coupled to the other housing portion so that the pins are in contact with the conductive strip.

Figure 13:
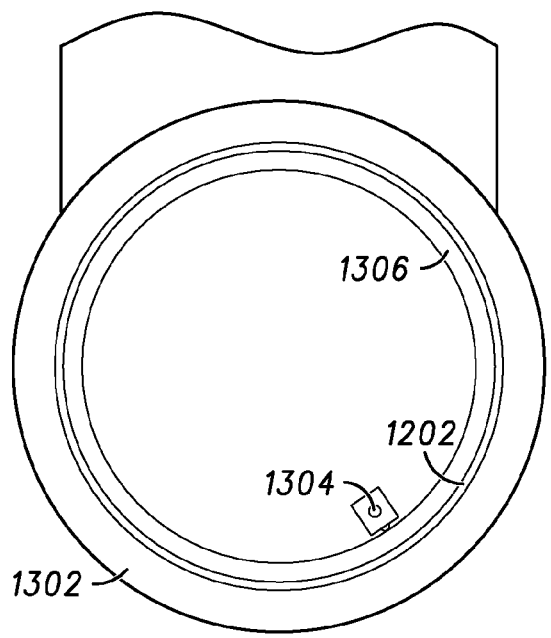
FIG. 13 is a top down exemplary view of the rotateable housing portion having a first exemplary rotary encoder.
Figure 14:
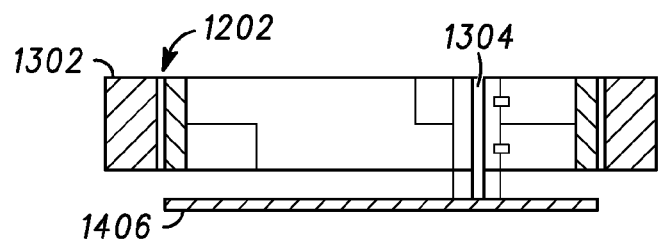
FIG. 14 is a section view of a portion of a rotateable housing portion.

In FIGS. 13 and 14, the conductive strip 1202 is disposed on an inner surface of the ring 204 in the exemplary embodiment. Alternatively, the bit pattern 1208 may be formed directly on the surface of the ring 204, for example by depositing conductive and non-conductive materials thereon. FIG. 13 illustrates a pogo pin mounting assembly 1304 mounted on an inner ring 1306 of the first housing portion 202, and FIG. 14 illustrates the pogo pin mounting assembly 1304 disposed on a circuit board 1406.

Figure 15:
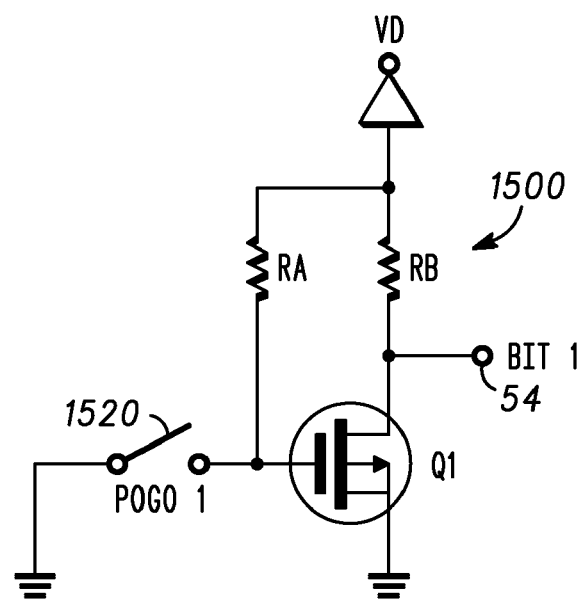
FIG. 15 is a first exemplary pull-down circuit.
Figure 16:
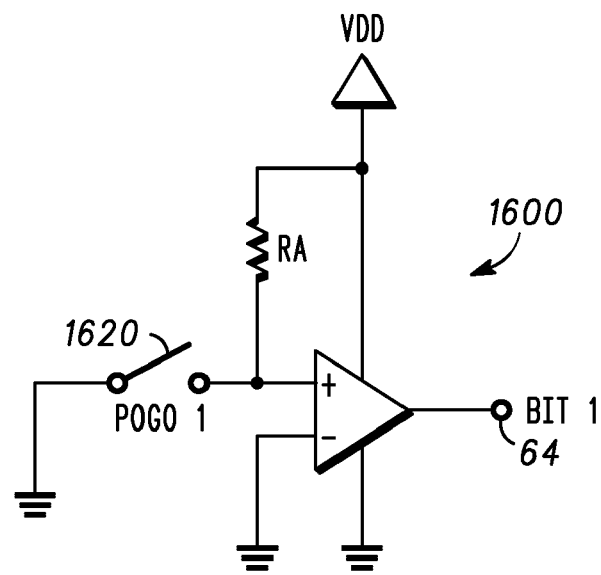
FIG. 16 is a second exemplary pull-down circuit.

The conductors of the rotary encoder are coupled to an electrical circuit that detects when an electrical connection between the conductors is made and broken by conductive and non-conductive portions of the strip. FIGS. 15 and 16 illustrate exemplary voltage pull-down circuits 1500 and 1600, respectively, with corresponding switches 1520 and 1620 representative of the contact made between the conductors of the rotary encoder. The generation of electrical connections is then sent to the processor 103. The processor 103 interprets the input signals from the rotary encoder and sends commands to the display to move the text accordingly.

Figure 17:
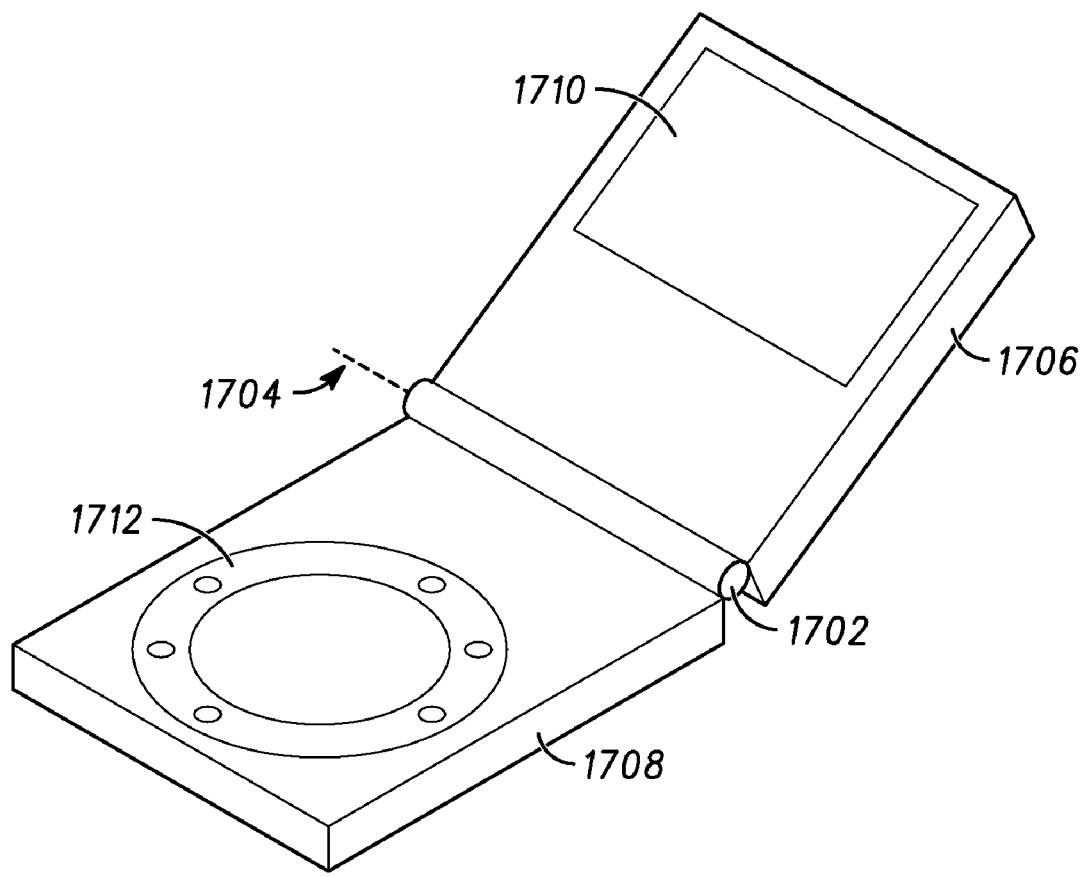
FIG. 17 is an exemplary front view of a housing in an open position.

The handheld device as shown in FIG. 17 is a clam style wireless communication device having two housing portions coupled together by a hinge 1702. The hinge 1702 has at least one axis of rotation 1704. The second housing portion 1706, coupled through the hinge 1702 to the first housing portion 1708, includes one or more displays 1710 of the handset and a ring 1712 on a first housing portion 1708. The display may be in a second housing portion 1704 or in the first housing portion 1708 and may also be encompassed by the ring 1712 (not shown).

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that numerous modifications and variations may be made thereto without departing from the scope and spirit of the inventions, which are to be limited not by the exemplary embodiments but by the appended claims.

What is claimed is:

1. A wireless communication device comprising:
   a first housing portion having electronic components;
   a controller of said wireless communication device said controller having a plurality of functions;
   an interchangeable rotateable ring having a plurality of icons disposed on a first surface thereof, wherein said each icon of a plurality of icons corresponds to a function of said device;
   a interchangeable rotateable ring ID coupled to said interchangeable rotateable ring, said ID readable by said wireless communication device, and said ID corresponding to said at least one function of a plurality of functions; and
   a position sensor coupled to said first housing portion and to said interchangeable rotateable ring, wherein a set of modes is changed based on replacing the ring.

2. The device of claim 1, wherein said functions are phone functions, gaming functions, personal information management functions, or messaging functions.

3. The device of claim 2, a interchangeable rotateable ring ID reader coupled to said controller of said wireless communication device.

4. A method for menu selection short cut in a wireless communication device comprising:
   receiving a removable rotateable housing portion;
   downloading a software defined set of operating functions that correspond to said removable rotateable housing portion;
   reading an identification of said removable rotateable housing portion;
   determining a position of said removable rotateable housing portion relative to a first housing portion;
   changing a set of modes based on replacing the ring;
   operating a first function of said device that corresponds to said first position of said removable rotateable housing portion.

5. A selector ring adapted to movably couple to an electronic device comprising:
   a coupling means for removably coupling the selector ring to an electronic device and allowing said selector ring to move to a plurality of positions relative to said electronic device, each position associated with a function of said electronic device;
   an selector ring identification means readable by said electronic device, to identify at least one function of said device associated with said ring; and
   at least one indicia disposed on a surface of the selector ring, said indicia associated with a function of at least one function of said device, wherein a set of modes is changed based on replacing the ring.

* * * * *